(12) United States Patent  
Lection et al.

(10) Patent No.: US 9,915,936 B2  
(45) Date of Patent: *Mar. 13, 2018

(54) TRANSITION TO ACCESSIBILITY MODE (71) Applicant: International Business Machines Corporation, Armonk, NY (US)

(72) Inventors: David B. Lection, Raleigh, NC (US); Mark B. Stevens, Austin, TX (US); John D. Wilson, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/458,724

(22) Filed: Mar. 14, 2017

(65) Prior Publication Data  
US 2017/0186299 A1 Jun. 29, 2017

Related U.S. Application Data (63) Continuation of application No. 14/953,680, filed on Nov. 30, 2015.

(51) Int. Cl.  
*G08B 1/08* (2006.01)  
*G05B 19/4155* (2006.01)  
*G08B 21/22* (2006.01)

(52) U.S. Cl.  
CPC ........... *G05B 19/4155* (2013.01); *G05B 2219/33125* (2013.01); *G08B 21/22* (2013.01)

(58) Field of Classification Search  
None  
See application file for complete search history.

(56) References Cited

U.S. PATENT DOCUMENTS 5,016,003 A * 5/1991 Rice, Jr. ............ H04M 1/2474  
340/4.11  
5,600,311 A * 2/1997 Rice ...................... A61F 4/00  
340/4.11

(Continued)

FOREIGN PATENT DOCUMENTS

GB 2466240 A 6/2010  
WO 0021048 A1 4/2000

(Continued)

OTHER PUBLICATIONS

Lection et al., "Transition to Accessibility Mode," U.S. Appl. No. 14/953,680, filed Nov. 30, 2015, 34 pages.

(Continued)

*Primary Examiner* — Adolf Dsouza  
(74) *Attorney, Agent, or Firm* — VanLeeuwen & VanLeeuwen; Mercedes L. Hobson (57) ABSTRACT

An approach is disclosed that provides assistance to disabled individuals when utilizing public spaces. In the approach, a wireless message is received at a detector of the system with the wireless message being from a device worn by a disabled individual. The wireless message includes impairment data pertaining to the disabled individual. In addition, reception of the wireless message indicates that the disabled individual has entered a physical area that provides accommodations to disabled individuals. The approach identifies an impairment pertaining to the disabled individual and adjusts a device setting of a device in the physical area based on the identified impairment of the disabled individual.

20 Claims, 7 Drawing Sheets

(56) References Cited

U.S. PATENT DOCUMENTS

| | | |
|---|---|---|
| 8,296,686 B1 | 10/2012 | Tedesco et al. |
| 9,662,590 B1 | 5/2017 | Villarreal et al. |
| 2002/0106620 A1 | 8/2002 | Barnum |
| 2009/0271503 A1* | 10/2009 | Pearce .............. H04M 3/42178 709/220 |
| 2015/0163412 A1* | 6/2015 | Holley .................. G05B 15/02 348/143 |
| 2015/0339905 A1 | 11/2015 | Stevens et al. |

FOREIGN PATENT DOCUMENTS

| | | |
|---|---|---|
| WO | 2007020551 A2 | 2/2007 |
| WO | 2014045225 A1 | 3/2014 |

OTHER PUBLICATIONS

"List of IBM Patents or Patent Applications Treated as Related," Letter from Leslie A. Van Leeuwen, dated Mar. 14, 2017, 1 page.

* cited by examiner

TRANSITION TO ACCESSIBILITY MODE

BACKGROUND

When a fully able person encounters the world, they find an environment immediately primed to execute their intentions. They pick up the phone, the volume is in a range that is functional. When they look at a display screen, the font is a readable size. When they look at book titles in a library, the ambient lighting is enough to clearly see the titles on the book spine. In contrast, for a person with a disability, such as a hearing impairment, when they pick up a phone, they likely have to adjust the volume before they can hear adequately if at all. If a person with seriously degraded eyesight tries to read a book title in a library, the ambient lighting is probably not going to be adequate to facilitate reading. There are known adaptations that exist to ameliorate many impairments, but these adaptations need to be invoked or adjusted or preset. While personal devices may be able to provide accommodations in a private settings, such accessibility mode is impractical for public devices and in public spaces.

SUMMARY

An approach is disclosed that provides assistance to disabled individuals when utilizing public spaces. In the approach, a wireless message is received at a detector of the system with the wireless message being from a device worn by a disabled individual. The wireless message includes impairment data pertaining to the disabled individual. In addition, reception of the wireless message indicates that the disabled individual has entered a physical area that provides accommodations to disabled individuals. The approach identifies an impairment pertaining to the disabled individual and adjusts a device setting of a device in the physical area based on the identified impairment of the disabled individual.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

FIGS. 1-7 show an approach for providing accommodations to disabled individuals when the individual enters a physical area in a public space that provides such accommodations. A disabled individual wears or carries in pocket, purse, or wallet a small token that is capable of beaconing a message that at a minimum identifies the impairment or impairments. As used herein, "worn" means that the device is worn or carried in a position proximate to the disabled individual. When the disabled individual enters the physical area of a device with automatic adaptation capability, the adaptable device detects the incoming disabled person, reads the impairment details and then adjusts itself accordingly. This beacon may optionally identify the user, and this identification will be used in follow on processing for the user.

Embodiments of the present invention may be a system, a method, and/or a computer program product. The computer program product may include a computer readable storage medium (or media) having computer readable program instructions thereon for causing a processor to carry out aspects of embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
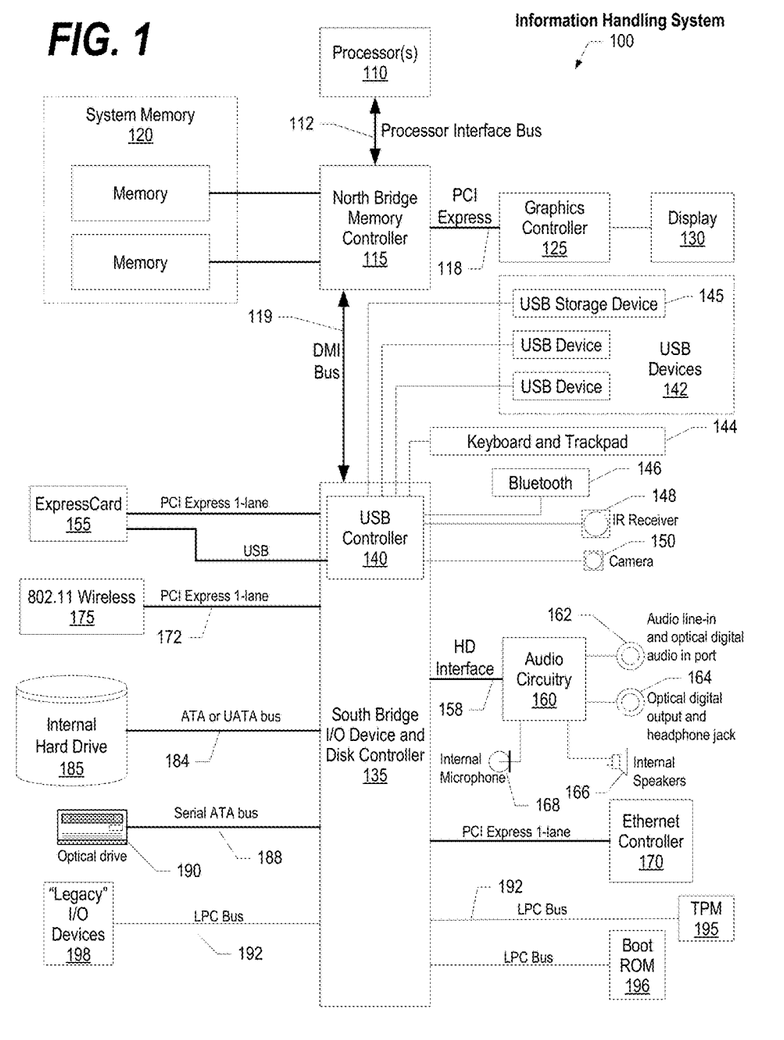
FIG. 1 is a block diagram of a data processing system in which the methods described herein can be implemented.
Figure 2:
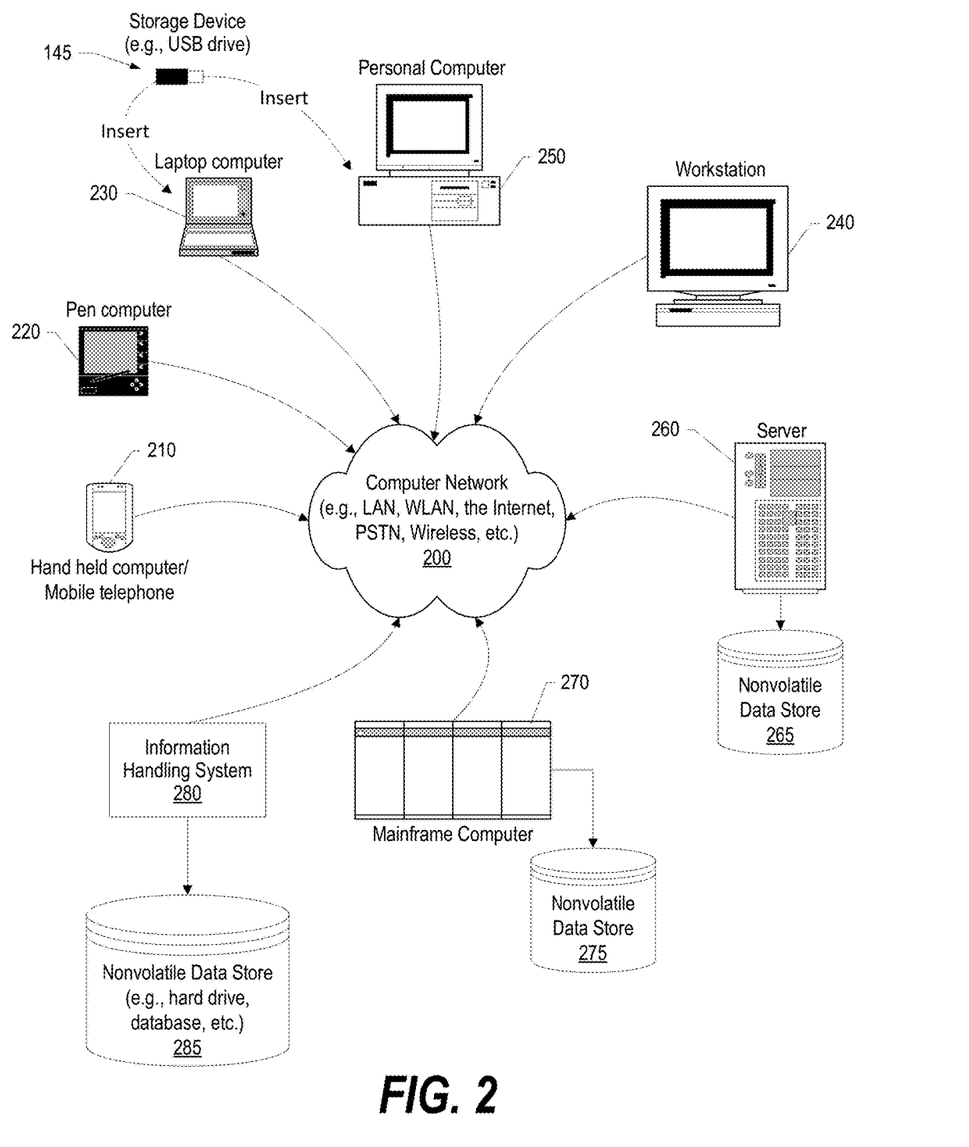
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE.802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
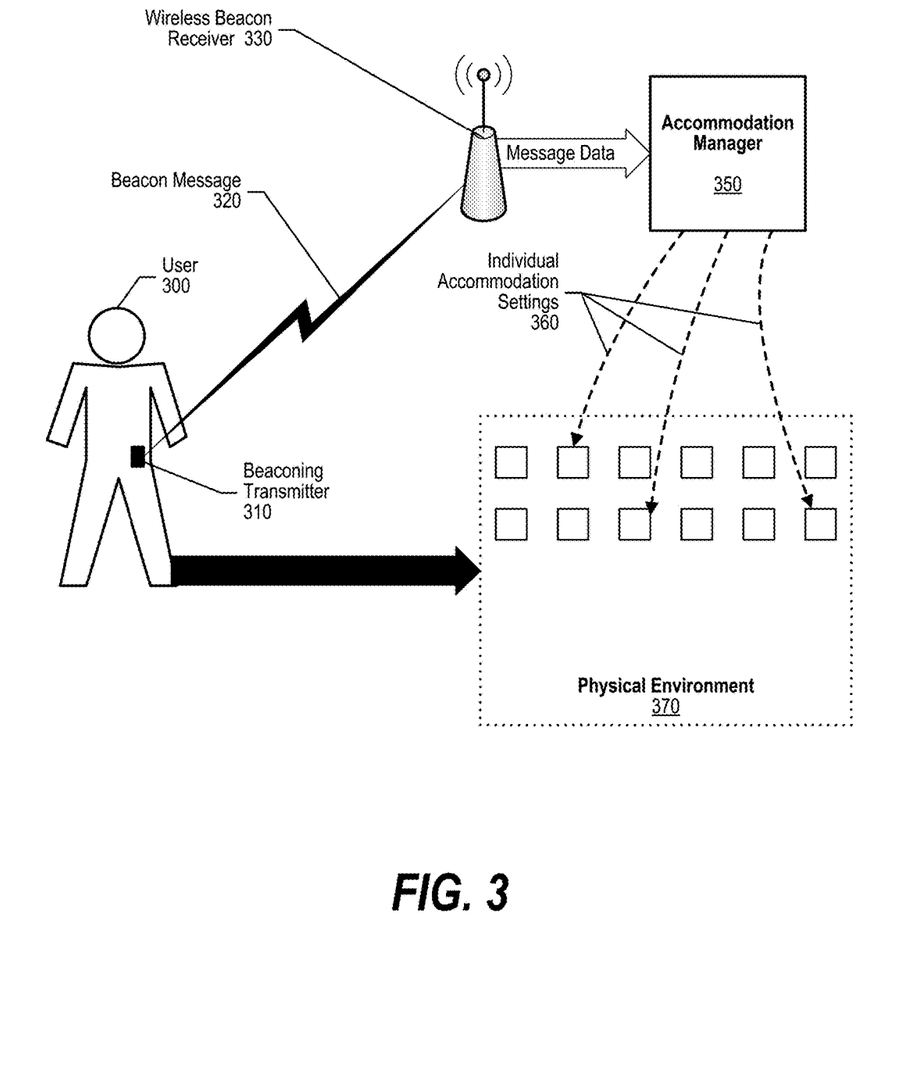
FIG. 3 is a component diagram depicting the various components used in providing a transition to accessibility mode.

FIG. 3 is a component diagram depicting the various components used in providing a transition to accessibility mode. User 300 is a disabled individual with one or more impairments, such as a vision impairment, hearing impairment, etc. User 300 wears beaconing transmitter 310 that transmits a wireless message (beacon message 320) that includes impairment data pertaining to the user's impairment. Beaconing transmitter 310 can be a specialized device designed to transmit the impairment data described herein. In other embodiments, beaconing transmitter 310 can be a more general purpose device, such as a smart phone, smart watch, etc. that is capable of transmitting wireless messages including beacon message 320. Wireless beacon receiver 330 receives the wireless message from the device (310) that is worn by the impaired individual (user 300). Reception of the wireless message indicates that the impaired individual has entered physical area 370 that includes one or more devices that have settings that are automatically adjusted to better accommodate the individual's impairments.

Accommodation manager 350 receives the message data from beacon receiver 330 and identifies an impairment that pertains to the disabled individual. Based on the impairment data pertaining to the individual, accommodation manager 350 adjusts one or more device settings of devices in physical area 370. In one embodiment, the impairment data includes the degree of the impairment that pertains to the disabled individual so that the settings of the devices can be adjusted based on the degree of impairment. Once the disabled individual leaves physical area 370, the device settings are reset to their previous setting levels.

FIGS. 4-7 provide flowcharts showing details on configuring and implementing a system that provides location-based accommodations to a disabled individual when the system detects that the individual has entered a physical area. The following examples illustrate some possible embodiments of the system with particular disabilities in mind.

First Embodiment Method (television, pc monitor, store display, etc). In this embodiment, the Beacon is detected and Impairments are determined. The Control System executes adaptations:

if hearing impairment partial
   volume is increased
   playback speed is adjusted
   repeat section options are included
if hearing impairment is total
   subtitles are invoked
if minor color blindness in red spectrum
   saturate the red colors or shift to alternate color scheme
if some degree of visual impairment
   adjust font size
if complete visual impairment
   execute text reading
etc Second Embodiment Method (establishment adaptations). In this embodiment, the Beacon is detected and Impairments are determined. The Control System executes adaptations:
if hearing impairment partial
   lower ambient noise through reducing volume of store music near detected impaired person
if some degree of visual impairment
   adjust store lighting brighter near impaired individual
   adjust specific item lighting
   invoke moving lights for navigation assistance
   invoke highlighting for items associated with personal preferences
if complete visual impairment
   enable sound cues: ("this is the bread aisle", "This is the dairy case" . . . )
if in a wheel chair or walker
   automatically open door Third Embodiment Method (store clerk smart device). In this embodiment, the Beacon is detected and Impairments are determined. The Control System executes adaptations:
Establishment employee (attendant) is notified
Employee is directed to impaired individual's location within establishment
Education information regarding the impairment is imparted to the employee
Guided product information is made available to employee
   e.g., individuals with visual impairment and a gluten intolerance may need to find the products that are gluten free
if impairment is hearing then
   Speech to text mode on smart device is invoked All Embodiment Post Processing. The following process steps further apply to all embodiments after potential adjustments are made:
If ALL-ADJUSTMENTS-COMPLETE then SIGNAL success to the user else SIGNAL the user which adjustments could not be made In optional embodiments, the device the user carries may be able to signal the user that adjustments have made to accommodate the user. The style and modality of the adjustments made depends on the handicaps the user may have. Notifications could include sound, vibration, voice, or lights in any sequence. One signal would indicate to the user success in making the adjustments, while a different signal could tell the user some adjustments could not be completed.

If USER-IS-IDENTIFIED and DEVICE-IS-CAPABLE-OF-STORING-PREFERENCES then STORE user unique preference settings for the next time the user approaches the device If the device the user carries can identify the user, then this ID can be used as an index or key to store in the device the preferences the user selected. The device may allow the user to additionally fine tune any adjustment, and all of these changes could be saved. This would allow for a faster setup the next time, and could also allow the user to identify himself in the future without having the signalling device present.

If USER-IS-IDENTIFIED and DEVICE-IS-CAPABLE-OF-FEEDBACK then TRANSMIT usage information from the system/store/user on what happened with the adaptation for analysis. The system that addressed the adaptation communicates feedback to the user device on what action was taken by the user—if the user was able to complete the task(s) within a reasonable threshold (compared against other users or to this users baseline) then that would indicate that the adaptation was useful. If the task was outside the threshold then this may indicate the system should ask for additional adaptations into account for this user the next time (increase the increased volume, or font, . . . ).

Figure 4:
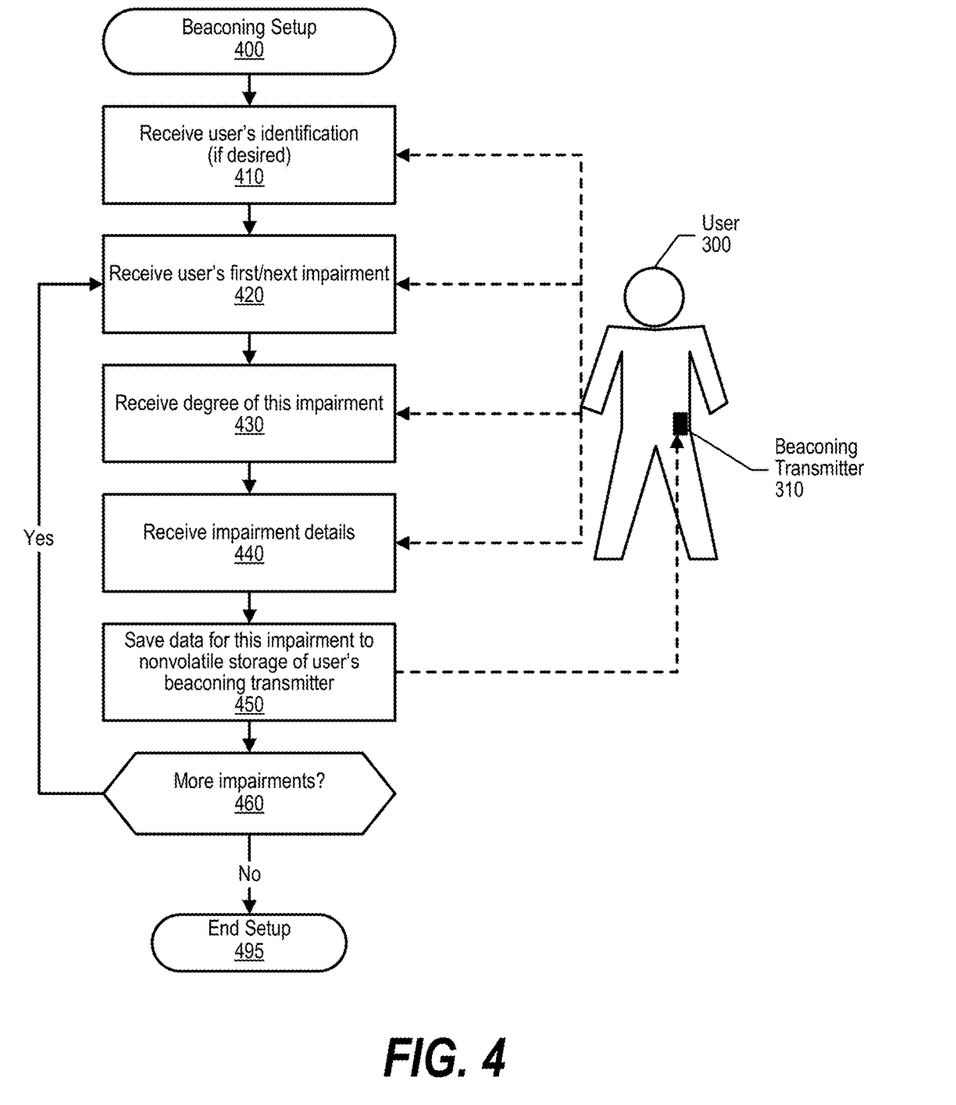
FIG. 4 is a flowchart depicting steps performed in setting up a beaconing transmitter worn by a disabled individual.

FIG. 4 is a flowchart depicting steps performed in setting up a beaconing transmitter worn by a disabled individual. FIG. 4 processing commences at 400 and shows the steps taken by a process that sets up a beaconing transmitter for an impaired individual (user 300). At step 410, the process receives the user's identification (if desired), such as the disabled individuals name so that an attendant, if summoned, can better communicate with the user. At step 420, the process receives the user's first impairment (e.g., hearing impairment, etc.). At step 430, the process receives degree of this impairment (e.g., slight impairment, moderate impairment, severe impairment, total impairment, etc.). At step 440, the process receives impairment details (e.g., individual has trouble hearing high pitched sounds, etc.). At step 450, the process saves the data pertaining to this impairment to a nonvolatile storage area of the user's beaconing transmitter 310. The process determines as to whether there are more impairments of the individual that the user wishes to set up (decision 460). If there are more impairments that the user wishes to set up, then decision 460 branches to the 'yes' branch which loops back to step 420 to receive data corresponding to the next impairment as described above. This looping continues until there are no further impairments to describe, at which point decision 460 branches to the 'no' branch exiting the loop. Setup processing provided by FIG. 4 processing thereafter ends at 495.

Figure 5:
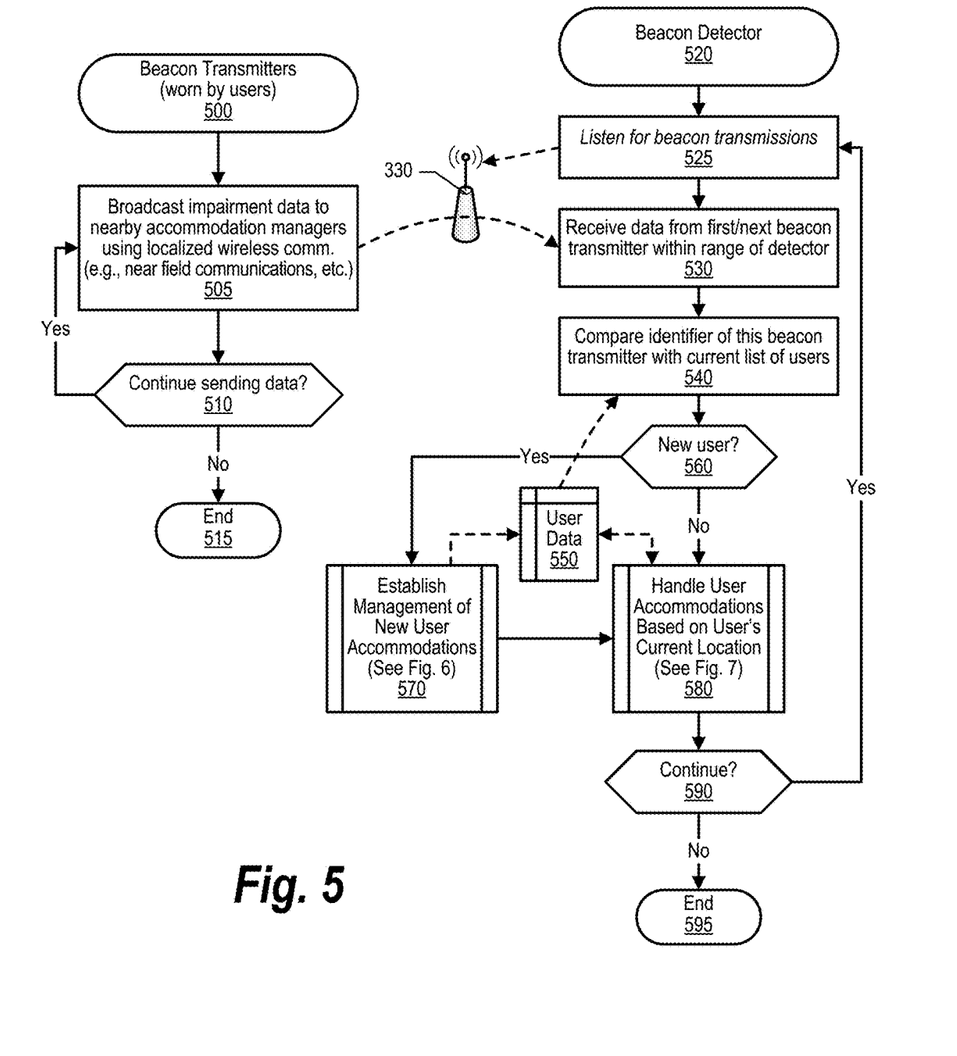
FIG. 5 is a flowchart depicting interactions between beacon transmitters worn by disabled individuals and detectors.

FIG. 5 is a flowchart depicting interactions between beacon transmitters worn by disabled individuals and beacon detectors deployed proximate to a physical area that provides accommodations to disabled individuals. FIG. 5 processing commences at 500 and shows the steps taken by a beacon transmitter process that transmits impairment data from beacon transmitters worn by disabled individuals. At step 505, the beacon transmitter process broadcasts the disabled individual's impairment data to any nearby accommodation managers' beacon detectors by transmitting wireless message data using a localized wireless communication means (e.g., tag, Radio-Frequency Identification (RFID) message, Near-Field Communication (NFC) message, Bluetooth message, wireless local area network (WiFi), etc.). The beacon transmitter process determines whether to continue sending impairment data on behalf of the disabled individual (decision 510). If data continues to be sent, then decision 510 branches to the 'yes' branch which loops back to step 505 to repeat the process. This looping continues until data is no longer being sent (e.g., the user turns off the beacon transmitting device, etc.), at which point decision 510 branches to the 'no' branch exiting the loop. Beacon transmitter processing thereafter ends at 515.

Beacon detection processing is shown commencing at 520. At step 525, the beacon detection process listens for beacon transmissions, or messages, that are being transmitted by beacon transmitters on behalf of disabled individuals. At step 530, the beacon detection process receives impairment data from the first beacon transmitter that is within range of the beacon detector. At step 540, the beacon detection process compares an identifier included in the received impairment message with identifiers corresponding to a current list of disabled individuals that are currently being accommodated by the system. Memory area 550 stores the list of disabled individuals that are currently being accommodated by the system. This list includes identifier data as well as impairment and accommodation data pertaining to the disabled individuals that are being assisted by the system.

Based on the comparison performed at step 540, the beacon detection process determines whether this disabled individual is new to this system or is already in the list of current users (decision 560). If this disabled individual is new to this system, then decision 560 branches to the 'yes' branch to perform predefined process 570. At predefined process 570, the beacon detection process performs the Establish Management of New User Accommodations routine (see FIG. 6 and corresponding text for processing details). On the other hand, if this disabled individual is already in the list of current users, then decision 560 branches to the 'no' branch to perform predefined process 580. At predefined process 580, the beacon detection process performs the Handle User Accommodations Based on User's Current Location routine (see FIG. 7 and corresponding text for processing details).

The beacon detection process determines as to whether to continue providing service (decision 590). If service is continuing, then decision 590 branches to the 'yes' branch which loops back to step 525 to continue listening for beacon transmissions from disabled individuals and processing such messages as described above. This looping continues until service is terminated (e.g., system is shut down, turned off-line for maintenance, etc.), at which point decision 590 branches to the 'no' branch exiting the loop. Beacon detection processing thereafter ends at 595.

Figure 6:
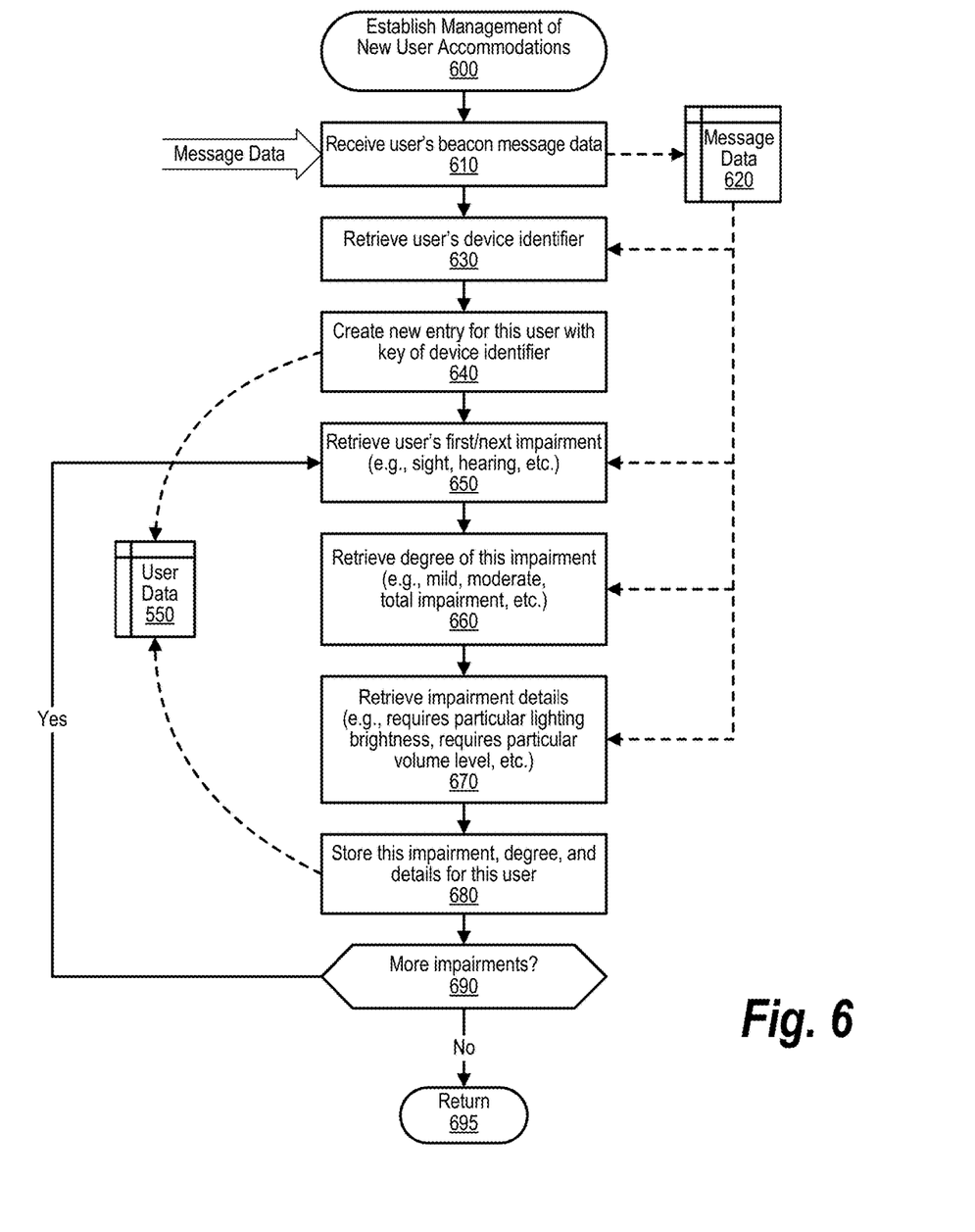
FIG. 6 is a flowchart depicting steps performed in establishing the management of accommodations provided to a disabled individual when first detected by the system.
Figure 7:
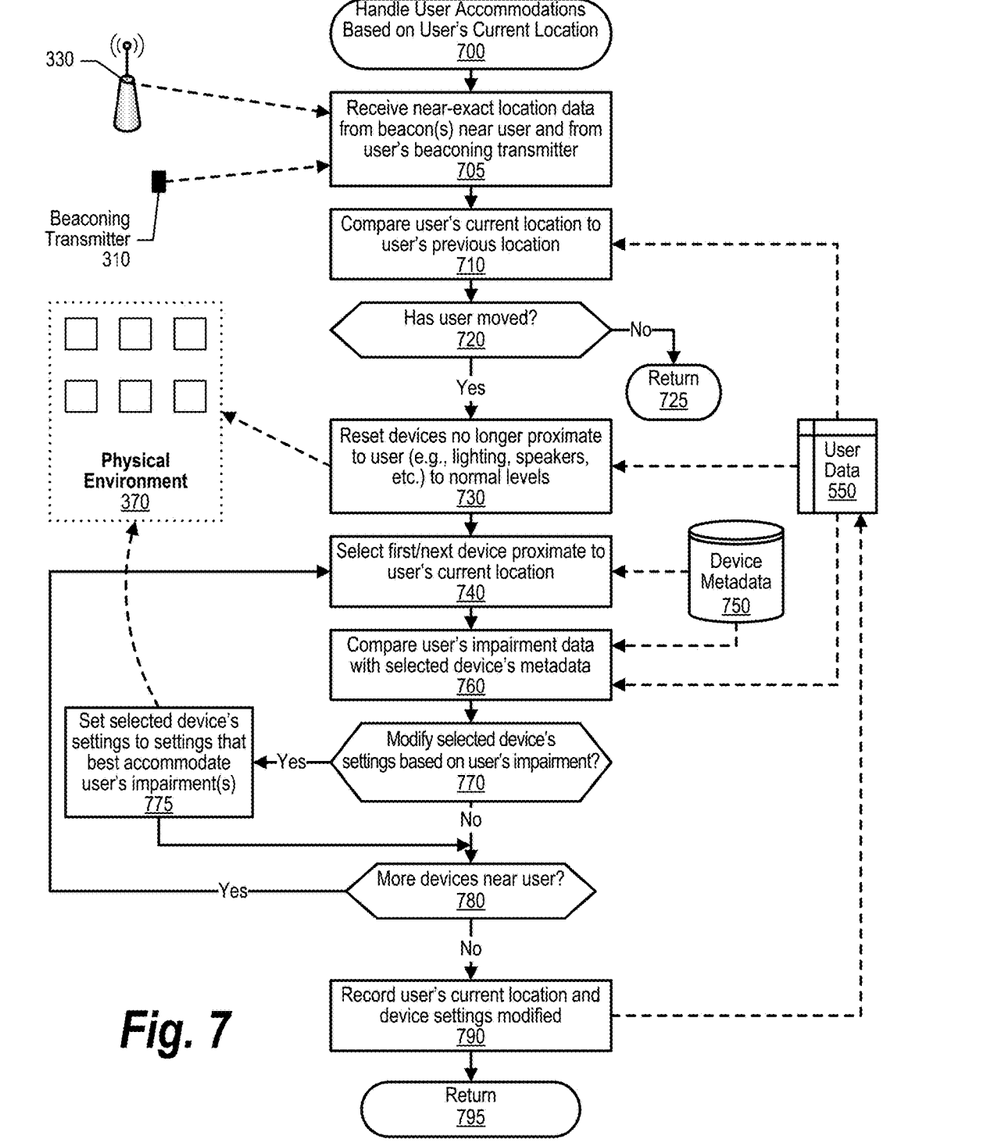
FIG. 7 is a flowchart depicting steps performed in handling accommodations provided to a disabled individual based on the individual's current location.

FIG. 6 is a flowchart depicting steps performed in establishing the management of accommodations provided to a disabled individual when first detected by the system. FIG. 6 processing commences at 600 and shows the steps taken by a process that establishes management of accommodations for new users of the system. New users are those disabled individuals that are not currently being accommodated by the system and, through the processes shown in FIGS. 6 and 7 are provided with accommodations based on the individuals' particular impairments. At step 610, the process receives the message data from a disabled individual with the message data having been received at the system's beacon detectors. The message data is stored in memory area 620. At step 630, the process retrieves the disabled individual's unique identifier from the message data. The unique identifier might be a device identifier from the individual's beacon transmitter.

At step 640, the process creates a new entry for this disabled individual using the individual's retrieved identifier as a key value. The identifiers, impairment data, and accommodation data is stored in memory area 550. At step 650, the process retrieves this disabled individual's first impairment (e.g., sight, hearing, etc.) from the message data stored in memory area 620. At step 660, the process retrieves the degree of this impairment (e.g., mild, moderate, severe, total impairment, etc.) from the message data stored in memory area 620. At step 670, the process retrieves any impairment details (e.g., requires particular lighting brightness, requires particular volume level, etc.) from the message data stored in memory area 620. At step 680, the process stores the impairment type, degree of impairment, and any details of the impairment for this disabled individual in memory area 550.

The process determines as to whether this individual has any more impairments that need to be processed in order for the system to accommodate such impairments (decision 690). If this individual has any more impairments, then decision 690 branches to the 'yes' branch which loops back to step 640 to retrieve and process the next impairment as described above. This looping continues until there are no more impairments to process, at which point decision 690 branches to the 'no' branch exiting the loop. FIG. 6 processing thereafter returns to the calling routine (see FIG. 5) at 695.

FIG. 7 is a flowchart depicting steps performed in handling accommodations provided to a disabled individual based on the individual's current location. FIG. 7 processing commences at 700 and shows the steps taken by a process that handles a disabled individual's accommodations based on the individual's current location in a physical area that is being serviced by the system. At step 705, the process receives near-exact location data from the beacon detectors that are near this disabled individual as well as from the individual's beaconing transmitter if such data (e.g., GPS data, etc.) is provided by the beaconing transmitter. At step 710, the process compares this individual's current location to the individual's previous location. Based on the comparison performed at step 710, the process determines whether the individual has moved or is new to the physical area (decision 720). If the individual has moved or is new to the area, then decision 720 branches to the 'yes' branch to process accommodations using steps 730 through 790. On the other hand, if the individual has not moved and is not new to the physical area, then decision 720 branches to the 'no' branch whereupon processing returns to the calling routine (see FIG. 5) at 725.

At step 730, the process resets devices with settings that were previously altered and that are no longer proximate to the disabled individual (e.g., lighting, speakers, etc.) back to normal levels. At step 740, the process selects the first device that is now proximate to individual's current location. The device data is retrieved from data store 750. At step 760, the process compares user's impairment data with selected device's metadata. The selected device's metadata is also retrieved from data store 750. Based on the comparison at step 760, the process determines whether to alter the selected device's settings based on this disabled individual's impairment (decision 770). If the decision is to alter the selected device's settings, then decision 770 branches to the 'yes' branch to perform step 775. On the other hand, if the decision is not to alter the selected device's settings, then decision 770 branches to the 'no' branch bypassing step 775. At step 775, the process alters the selected device's settings to settings that best accommodate user's impairment(s). For example, volume might be increased for an individual with a hearing impairment, ambient lighting might be increased for an individual with a vision impairment, etc.

The process determines as to whether there are more devices near user that might be suitable candidates for altering the device's settings based on the individual's impairments (decision 780). If there are more devices near user that might be suitable candidates for altering the device's settings based on the individual's impairments, then decision 780 branches to the 'yes' branch which loops back to step 740 to select and process the next device. This looping continues until there are no more devices near the user to process, at which point decision 780 branches to the 'no' branch exiting the loop. At step 790, the process records the disabled individual's current location data and the device settings that were altered. This data is stored in memory area 550. FIG. 7 processing thereafter returns to the calling routine (see FIG. 5) at 795.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, implemented by an information handling system that includes one or more processors and a memory accessible by at least one of the processors, the method comprising:
    receiving, at a detector, a wireless message from a device worn by a disabled individual, wherein the wireless message includes impairment data pertaining to the disabled individual, and wherein the receiving indicates that the disabled individual has entered a physical area that provides one or more accommodations to disabled individuals;
    identifying an impairment pertaining to the disabled individual; and
    transmitting a notification message to an attendant of the physical area, wherein the notification message informs the attendant that the disabled individual has entered the physical area.

2. The method of claim 1 further comprising:
    adjusting a device setting of a device in the physical area based on the identified impairment of the disabled individual.

3. The method of claim 2 further comprising:
    after the adjusting, detecting that the disabled individual has left the physical area; and
    readjusting the device setting back to a previous level in response to detecting that the disabled individual has left the physical area.

4. The method of claim 2 further comprising:
    receiving a degree of the impairment that pertains to the disabled individual, wherein the adjusting of the device setting is performed based on the degree of the impairment.

5. The method of claim 2 wherein the device setting is selected from the group consisting of increasing a volume of a speaker, displaying a set of one or more subtitles, providing a text-to-speech conversion, adjusting one or more display features, and adjusting an ambient lighting level.

6. The method of claim 2 wherein the device is selected from the group consisting of a microphone, a speaker, a lighting control, a camera, and a display.

7. The method of claim 1 wherein the wireless message is selected from the group consisting of a tag, a Radio-Frequency Identification (RFID) message, a Near-Field Communication (NFC) message, a Bluetooth message, and a wireless local area network (WiFi).

8. An information handling system comprising:
    one or more processors;
    a memory coupled to at least one of the processors;
    a wireless receiver accessible by at least one of the processors; and
    a set of instructions stored in the memory and executed by at least one of the processors, wherein the set of instructions perform actions comprising:
        receiving, at a detector, a wireless message from a device worn by a disabled individual, wherein the wireless message includes impairment data pertaining to the disabled individual, and wherein the receiving indicates that the disabled individual has entered a physical area that provides one or more accommodations to disabled individuals;
        identifying an impairment pertaining to the disabled individual; and
        transmitting a notification message to an attendant of the physical area, wherein the notification message informs the attendant that the disabled individual has entered the physical area.

9. The information handling system of claim 8 wherein the actions further comprise:
    adjusting a device setting of a device in the physical area based on the identified impairment of the disabled individual.

10. The information handling system of claim 9 wherein the actions further comprise:
    after the adjusting, detecting that the disabled individual has left the physical area; and
    readjusting the device setting back to a previous level in response to detecting that the disabled individual has left the physical area.

11. The information handling system of claim 9 wherein the actions further comprise:
    receiving a degree of the impairment that pertains to the disabled individual, wherein the adjusting of the device setting is performed based on the degree of the impairment.

12. The information handling system of claim 9 wherein the device setting is selected from the group consisting of increasing a volume of a speaker, displaying a set of one or more subtitles, providing a text-to-speech conversion, adjusting one or more display features, and adjusting an ambient lighting level.

13. The information handling system of claim 9 wherein the device is selected from the group consisting of a microphone, a speaker, a lighting control, a camera, and a display.

14. The information handling system of claim 8 wherein the wireless message is selected from the group consisting of a tag, a Radio-Frequency Identification (RFID) message, a Near-Field Communication (NFC) message, a Bluetooth message, and a wireless local area network (WiFi).

15. A computer program product stored in a non-transitory computer readable storage medium, comprising computer instructions that, when executed by an information handling system, causes the information handling system to perform actions comprising:

receiving, at a detector, a wireless message from a device worn by a disabled individual, wherein the wireless message includes impairment data pertaining to the disabled individual, and wherein the receiving indicates that the disabled individual has entered a physical area that provides one or more accommodations to disabled individuals;

identifying an impairment pertaining to the disabled individual; and transmitting a notification message to an attendant of the physical area, wherein the notification message informs the attendant that the disabled individual has entered the physical area.

16. The computer program product of claim 15 wherein the actions further comprise:

adjusting a device setting of a device in the physical area based on the identified impairment of the disabled individual.

17. The computer program product of claim 16 wherein the actions further comprise:

after the adjusting, detecting that the disabled individual has left the physical area; and readjusting the device setting back to a previous level in response to detecting that the disabled individual has left the physical area.

18. The computer program product of claim 16 wherein the actions further comprise:

receiving a degree of the impairment that pertains to the disabled individual, wherein the adjusting of the device setting is performed based on the degree of the impairment.

19. The computer program product of claim 16 wherein the device setting is selected from the group consisting of increasing a volume of a speaker, displaying a set of one or more subtitles, providing a text-to-speech conversion, adjusting one or more display features, and adjusting an ambient lighting level.

20. The computer program product of claim 15 wherein the device is selected from the group consisting of a microphone, a speaker, a lighting control, a camera, and a display.

* * * * *